US012759818B2

(12) United States Patent
Choi et al.

(10) Patent No.: US 12,759,818 B2
(45) Date of Patent: Oct. 13, 2026

(54) DOCKING SYSTEM BETWEEN VEHICLE AND BUILDING AND CONTROL METHOD THEREFOR

(71) Applicants: Hyundai Motor Company, Seoul (KR); Kia Corporation, Seoul (KR)

(72) Inventors: Ki Hyun Choi, Yongin-Si (KR); Hyung Sik Choi, Seoul (KR); Sun In You, Yesan-Eup (KR); Sang Heon Lee, Seoul (KR); Ji Hyun Song, Suwon-Si (KR); Won Chan Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/071,460

(22) Filed: Mar. 5, 2025

(65) Prior Publication Data

US 2025/0198228 A1 Jun. 19, 2025

Related U.S. Application Data

(62) Division of application No. 18/134,934, filed on Apr. 14, 2023, now Pat. No. 12,270,243.

(30) Foreign Application Priority Data

Oct. 18, 2022 (KR) ........................ 10-2022-0134241

(51) Int. Cl.
*B65G 69/00* (2006.01)
*E06B 1/04* (2006.01)
*E06B 1/70* (2006.01)

(52) U.S. Cl.
CPC .............. *B65G 69/008* (2013.01); *E06B 1/04* (2013.01); *E06B 1/70* (2013.01); *E06B 2001/707* (2013.01)

(58) Field of Classification Search
CPC ................................ B65G 69/008; E06B 1/70
(Continued)

(56) References Cited

U.S. PATENT DOCUMENTS 5,706,846 A * 1/1998 Sutton .................... A62B 31/00
135/900
7,290,378 B2 * 11/2007 Kalnay .................. E04H 15/48
52/79.5
(Continued)

FOREIGN PATENT DOCUMENTS

DE 102017011996 B3 3/2019
KR 10-2021-0130285 A 11/2021
(Continued)

OTHER PUBLICATIONS

Machine translation of WO-8501495-A1 (1985).*

*Primary Examiner* — Marcus Menezes
(74) *Attorney, Agent, or Firm* — MORGAN, LEWIS & BOCKIUS LLP

(57) ABSTRACT

A docking system between a vehicle and a building and a control method therefor include an entrance frame configured to extend in a direction towards a vehicle door, an external door provided at a side of the vehicle door to be opened, an internal door spaced from the external door and provided at a side of the building to be opened, and a sealing unit inserted into the entrance frame to be provided between the external door and the internal door, and configured to selectively extend in the direction toward the vehicle door to connect an internal space of the vehicle and an indoor space of the building into one space.

4 Claims, 5 Drawing Sheets

(58) Field of Classification Search
USPC .................................................. 52/2.14, 2.17
See application file for complete search history.

(56) References Cited

U.S. PATENT DOCUMENTS

| | | | | |
|---|---|---|---|---|
| 7,434,355 | B2 | 10/2008 | Patel et al. | |
| 7,600,282 | B2 * | 10/2009 | Grunewald .......... | B65G 69/008 14/71.3 |
| 7,774,987 | B2 | 8/2010 | Pfeiffer | |
| 12,129,134 | B2 * | 10/2024 | Gill ...................... | B65G 69/008 |
| 2022/0237968 | A1 | 7/2022 | Kim | |

FOREIGN PATENT DOCUMENTS

| | | | | |
|---|---|---|---|---|
| KR | 10-2369339 | B1 | 3/2022 | |
| KR | 10-2022-0069169 | A | 5/2022 | |
| WO | WO-8501495 | A1 * | 4/1985 | ............. B65G 67/02 |

* cited by examiner

DOCKING SYSTEM BETWEEN VEHICLE AND BUILDING AND CONTROL METHOD THEREFOR

CROSS-REFERENCE TO RELATED APPLICATION

The present application is a divisional of U.S. patent application Ser. No. 18/134,934, filed Apr. 14, 2023, which claims priority to Korean Patent Application No. 10-2022-0134241, filed on Oct. 18, 2022, the entire contents of which is incorporated herein for all purposes by this reference.

BACKGROUND OF THE PRESENT DISCLOSURE

Field of the Present Disclosure

The present disclosure relates to a docking system between a vehicle and a building and a control method therefor, and more particularly, to a docking system between a vehicle and a building, which may connect the internal space of the vehicle and the indoor space of the building into one space through a structure including an entrance frame, an external door, an internal door and a sealing unit, and a control method therefor.

Description of Related Art

As interest in electric vehicles and autonomous vehicles is increasing recently, various purposes and shapes of vehicles are being developed now. In an autonomous vehicle, a passenger in the internal space of the vehicle may behave freely, and thus, connectivity of the vehicle to various different environments becomes important.

Therefore, a concept of using the internal space of a vehicle as a space expanding from a living space when the vehicle is docked with a building to be connected to the living space may be considered.

However, in the case in which the internal space of the vehicle is simply connected to the indoor space of the building without sealing in the parked state of the vehicle, external dust, noise, etc., may be introduced into the internal space of the vehicle and the indoor space of the building, and thus, it may be difficult to use the internal space of the vehicle as the living space.

Therefore, a way to facilitate movement of a passenger between a vehicle and a building and to expand the internal space of the vehicle to a living space when the vehicle is connected to the building is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a docking system between a vehicle and a building, which may connect the internal space of the vehicle and the indoor space of the building into one space through a structure including an entrance frame, an external door, an internal door and a sealing unit, and a control method therefor.

In accordance with an aspect of the present disclosure, the above and other objects may be accomplished by the provision of a docking system between a vehicle and a building, the docking system including an entrance frame configured to extend in a direction towards a vehicle door, an external door provided at a side of the vehicle door to be opened, an internal door spaced from the external door and provided at a side of the building to be opened, and a sealing unit inserted into the entrance frame to be provided between the external door and the internal door, and configured to selectively extend in the direction toward the vehicle door to connect an internal space of the vehicle and an indoor space of the building into one space.

The docking system may further include a controller configured to control the external door, the internal door and the sealing unit.

The controller is configured to receive a docking request from the vehicle in a state in which parking of the vehicle is completed, and may open the external door according to the received docking request.

The controller may be configured to extend the sealing unit in the direction toward the vehicle door in an opened state of the external door, and may open the internal door in an opened state of the vehicle door.

When the internal space of the vehicle and the indoor space of the building are connected by extending the sealing unit in the direction toward the vehicle door, the vehicle door may be rotated within the sealing unit to be opened.

The controller is configured to receive a docking release request from the vehicle in an opened state of the internal door, and may close the internal door according to the received docking release request.

The external door and the internal door may be opened in a laterally sliding manner.

When the internal space of the vehicle and the indoor space of the building are connected by extending the sealing unit in the direction toward the vehicle door, the sealing unit may be coupled to a body frame of the vehicle.

The vehicle door and the body frame of the vehicle, coupled to the sealing unit, may be configured to be flat.

A gap between the sealing unit and the body frame of the vehicle may be sealed by a weather strip in a state in which the internal space of the vehicle and the indoor space of the building are connected.

The docking system may further include hydraulic cylinders inserted into the entrance frame so that one end portion of each of the hydraulic cylinders is connected to the internal door and a remaining end portion of each of the hydraulic cylinders is connected to the sealing unit, and the hydraulic cylinders may cause the sealing unit to extend in the direction toward the vehicle door.

In accordance with another aspect of the present disclosure, there is provided a method of controlling docking between a vehicle and a building, the method including receiving a docking request from the vehicle in a state in which parking of the vehicle is completed, opening an external door, provided at a side of a vehicle door to be opened, based on the received docking request, extending a sealing unit, inserted into the entrance frame to be provided between the external door and an internal door, and configured to be extensible in a direction toward the vehicle door to connect an internal space of the vehicle and an indoor space of the building into one space, in the direction toward the vehicle door in an opened state of the external door, and opening the internal door, spaced from the external door and provided at a side of the building to be opened, in an opened state of the vehicle door.

The method may further include opening the vehicle door by rotating the vehicle door within the sealing unit, when the internal space of the vehicle and the indoor space of the building are connected by extending the sealing unit in the direction toward the vehicle door.

The method may further include receiving a docking release request from the vehicle in an opened state of the internal door, and closing the internal door according to the received docking release request.

The method may further include coupling the sealing unit to a body frame of the vehicle, when the internal space of the vehicle and the indoor space of the building are connected by extending the sealing unit in the direction toward the vehicle door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
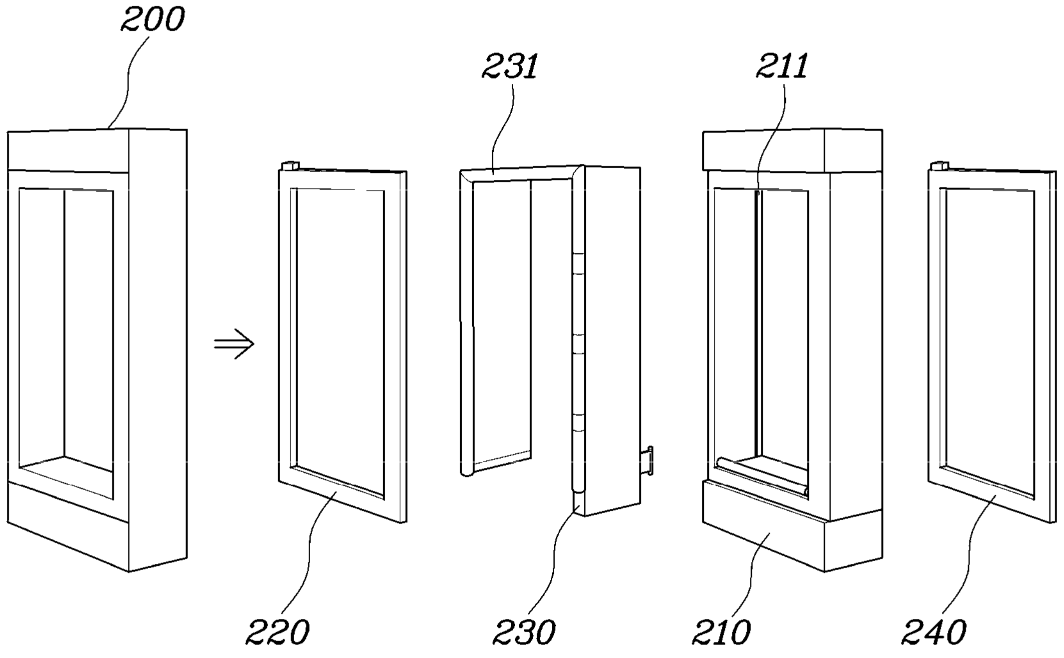
FIG. 1 is a view showing the configuration of a docking system between a vehicle and a building according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to exemplary embodiments of the present disclosure, examples of which are illustrated in the accompanying drawings. Wherever possible, the same reference numbers will be used throughout the drawings to refer to the same or like parts.

In the following description of the embodiments, suffixes, such as "module", "part" and "unit", are provided or used interchangeably merely in consideration of ease in statement of the specification, and do not have meanings or functions distinguished from one another.

In the following description of the exemplary embodiments of the present disclosure, a detailed description of known functions and configurations incorporated herein will be omitted when it may make the subject matter of the present disclosure rather unclear. Furthermore, the accompanying drawings will be exemplarily provided to describe the exemplary embodiments of the present disclosure, and should not be construed as being limited to the exemplary embodiments set forth herein, and it will be understood that the exemplary embodiments of the present disclosure are provided only to completely disclose the present disclosure and cover modifications, equivalents or alternatives which come within the scope and technical range of the present disclosure. In the following description of the embodiments, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Furthermore, the term "unit" or "control unit" included in the names of "motor control unit (MCU)", "hybrid control unit (HCU)", etc. is widely used to name a controller configured to control a specific function of a vehicle, and does not mean a generic functional unit.

A controller may include a communication device configured to communicate with other controllers or sensors to control the functions of the controller, a memory configured to store operating systems or logic commands and input and output information, and at least one processor configured to perform determination, calculation, decision, etc. required to control the functions of the controller.

An exemplary embodiment of the present disclosure is directed to providing a docking system between a vehicle and a building, which may connect the internal space of the vehicle and the indoor space of the building into one space through sealing to increase convenience of space utilization.

FIG. 1 is a view showing the configuration of a docking system between a vehicle and a building according to various exemplary embodiments of the present disclosure.

FIG. 1 mainly illustrates elements related to the exemplary embodiment of the present disclosure, and an actual docking system between a vehicle and a building may include a larger or smaller number of elements.

Referring to FIG. 1, a docking system of a vehicle 100 and a building according to various exemplary embodiments of the present disclosure may include an entrance frame 210, an external door 220, an internal door 240 and a sealing unit 230.

The entrance frame 210 may be formed in a shape which extends in a direction towards a vehicle door 120. The entrance frame 210 may extend in a straight line in the direction toward the vehicle door 120 to achieve docking between the vehicle 100 and the building, and the vehicle door 120 and a body frame 110 of the vehicle 100, which is coupled to the sealing unit 230, may be formed in a flat shape without curvature so that the sealing unit 230, which will be described later, comes into surface-contact with the body frame 110 when the sealing unit 230 extends in the direction toward the vehicle door 120. Therefore, parts of vehicle 100 other than the vehicle door 120 and the body frame 110 coming into contact with the sealing unit 230 may be formed in a shape having curvature.

Furthermore, the wall material on the internal surface of the vehicle 100 may be formed of the same material as the indoor space of the building so that a passenger may comfortably enter and exit the internal space of the vehicle 100 and the indoor space of the building when the internal space of the vehicle 100 and the indoor space of the building are connected into one space, being configured for increasing convenience of space utilization. Furthermore, to prevent noise from coming from the outside thereof when the internal space of the vehicle 100 and the indoor space of the building are connected into one space, the side surfaces of the entrance frame 210 may be formed to have a designated thickness or more.

Figure 2:
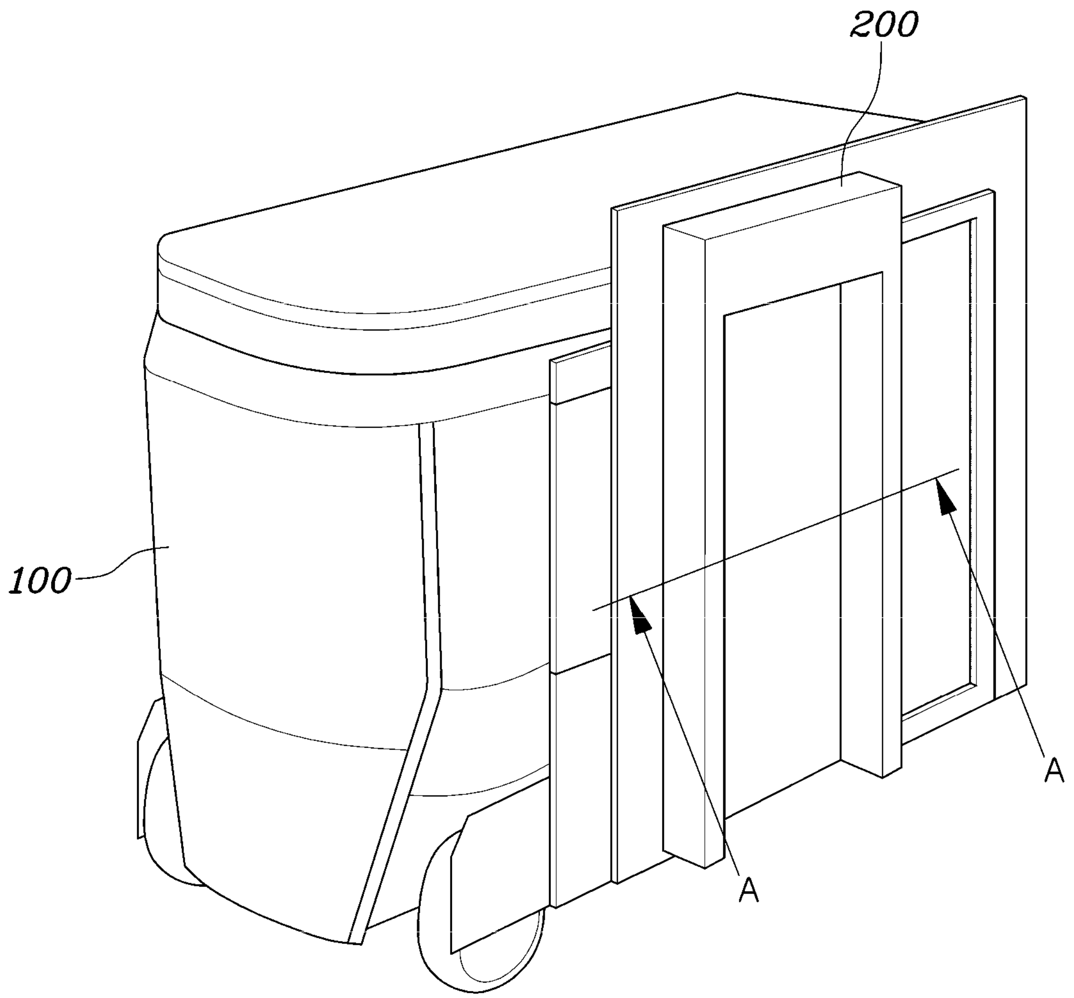
FIG. 2 is a perspective view of the docking system according to an exemplary embodiment of the present disclosure.
Figure 3:
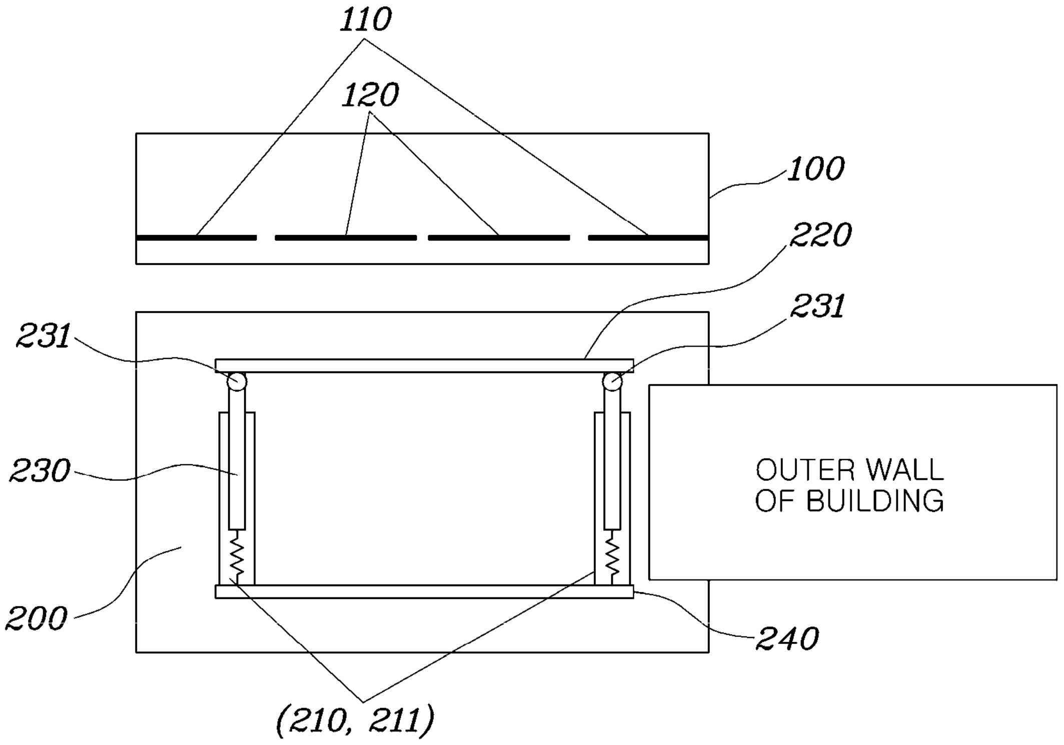
FIG. 3 is a cross-sectional view of the docking system according to various exemplary embodiments of the present disclosure, taken along line A-A of FIG. 2.

FIG. 2 is a perspective view of the docking system according to various exemplary embodiments of the present disclosure, and FIG. 3 is a cross-sectional view of the docking system 200 according to various exemplary embodiments of the present disclosure, taken along line A-A of FIG. 2. Referring to FIG. 3, the external door 220 may be provided at the side of the vehicle door 120 and the internal door 240 may be provided at the side of the building so that the external door 220 and the internal door 240 may be perpendicular to the entrance frame 210. The external door 220 and the internal door 240 may be disposed in parallel to each other to be perpendicular to the entrance frame 210. The external door 220 and the internal door 240 may be opened in a sliding manner laterally toward the external wall of the building. The external door 220 and the internal door 240 may be opened in the sliding manner toward the external wall of the building, and may thus occupy a small space and allow the sealing unit 230, which will be described later, to be extensible in the direction toward the vehicle door 120.

Furthermore, as shown in FIG. 3, the sealing unit 230 may be inserted into the entrance frame 210, and may thus be provided between the external door 220 and the internal door 240. The sealing unit 230 is provided between the external door 220 and the internal door 240 before the sealing unit 230 is extended in the direction toward the vehicle door 120, and the external door 220 is in a state of being slid toward the external wall of the building after the sealing unit 230 has been extended in the direction toward the vehicle door 120. A weather strip 231 is provided along the interface of the sealing unit 230 with the external door 220, and before the sealing unit 230 is extended, the external door 220 is not slid, and thus, the weather strip 231 may seal a gap between the external door 220 and the sealing unit 230. Furthermore, after the sealing unit 230 has been extended, the weather strip 231 may seal a gap between the body frame 110 of the vehicle 100 and the sealing unit 230. Here, the sealing unit 230 may be configured to be coupled to the body frame 110 of the vehicle 100 outside the vehicle door 120 when the sealing unit 230 is extended in the direction toward the vehicle door 120, so that the vehicle door 120 may be rotated to be opened toward the inside of the sealing unit 230 without obstacles.

Hydraulic cylinders 211 may be inserted into the entrance frame 210 so that one end portion of each of the hydraulic cylinders 211 is connected to the internal door 240 and the other end portion of each of the hydraulic cylinders 211 is connected to the sealing unit 230, as shown in FIG. 3. The hydraulic cylinders 211 may operate pistons through hydraulic pumping to extend the sealing unit 230 in the direction toward the vehicle door 120 and to reduce again the sealing unit 230 in the direction toward the building.

A method of controlling docking between the vehicle 100 and the building according to various exemplary embodiments of the present disclosure will be described based on the above-described configuration of the docking system with reference to FIG. 4.

Figure 4:
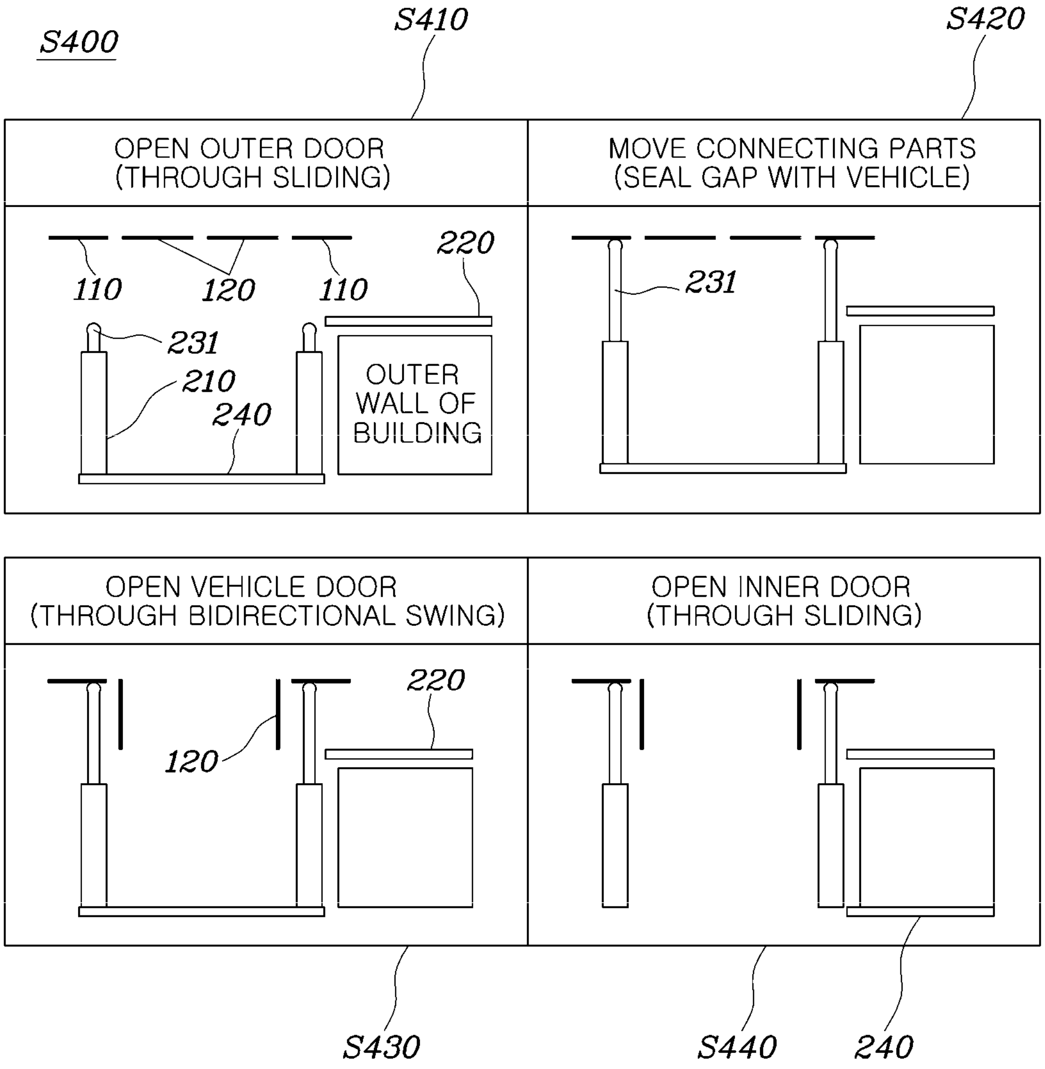
FIG. 4 is a schematic view showing a process of docking of the vehicle with the building according to an exemplary embodiment of the present disclosure.

FIG. 4 is a schematic view showing a process of docking of the vehicle 100 with the building according to various exemplary embodiments of the present disclosure. That is, FIG. 4 is a flowchart illustrating a procedure S400 of controlling the external door 220, the internal door 240 and the sealing unit 230 by a controller. The controller may be configured to control opening of the external door 220 and the internal door 240 and extension of the sealing unit 230 in the direction toward the vehicle door 120. The controller may set the order of opening the vehicle door 120, the external door 220 and the internal door 240, and may smoothly execute a process of connecting the internal space of the vehicle 100 and the indoor space of the building based on the set order. Detailed technical features in respective operations of the method of controlling docking between the vehicle 100 and the building according to an exemplary embodiment of the present disclosure are the same as or similar to technical features of the respective elements of the above-described docking system according to an exemplary embodiment of the present disclosure, and a detailed description thereof will thus be omitted.

First, when the controller receives a docking request between the vehicle 100 and the building, the controller may open the external door 220 (S410). The docking request between the vehicle 100 and the building may be output from the vehicle 100 in the state in which parking of the vehicle 100 at a position where the vehicle 100 may be docked with the building has been completed. For example, the vehicle 100 may set a docking mode based on the docking request between the vehicle 100 and the building, and the controller may open the external door 220 in response to reception of a docking mode signal of the vehicle 100. Here, the vehicle door 120 is not opened, and the external door 220 alone is opened in the direction toward the vehicle door 120.

Hereinafter, the controller may be configured to extend the sealing unit 230 in the direction toward the vehicle door 120 in the opened state of the external door 220 (S420). The controller may be configured to extend the sealing unit 230 so that the sealing unit 230 comes into surface-contact with the body frame 110 of the vehicle 100, and the body frame 110 of the vehicle coming into surface-contact with the sealing unit 220 may be formed in a flat shape without curvature. At the instant time, the vehicle door 120 is not opened.

After the sealing unit 230 has come into surface-contact with the body frame 110 of the vehicle 100, the vehicle door 120 may be opened (S430). Here, the vehicle door 120 may be rotated toward the inside of the sealing unit 120 to be opened. Both portions of the vehicle door 120 may swing around the external end portions thereof which come into contact with the body frame 110 of the vehicle 100 so that the central portion of the vehicle door 120 may be opened. The vehicle door 120 is opened toward the inside of the sealing unit 230, and thus, passengers may stand by safely in the internal space of the vehicle 100 until the internal space of the vehicle 100 is connected to the indoor space of the building. Here, for the safety of the passengers, the internal door 240 may remain closed.

Thereafter, the controller may open the internal door 240 in the opened state of the vehicle door 120 (S440). In the completely opened state of the vehicle door 120, the internal door 240 may be slid laterally toward the external wall of the building. As the internal door 240 provided at an entrance of the building is opened, the passengers of the vehicle 100 may move from the internal space of the vehicle 100 to the indoor space of the building.

Although not shown in FIG. 4, the controller may perform a process of separating the internal space of the vehicle 100 from the indoor space of the building in the state in which the internal space of the vehicle 100 and the indoor space of the building are connected into one space. Such a process may be performed in the opposite order to the order of the above-described process of docking the vehicle 100 with the building. For example, when the controller receives a docking release request from the vehicle 100 in the opened state of the internal door 240, i.e., in the state in which the internal space of the vehicle 100 and the indoor space of the building are connected into one space, the controller may perform docking release control in response to the docking release request.

First, the controller may close the internal door 240 based on the received docking release request (opposite to S440). When sliding of the internal door 240 from the external wall of the building to the entrance frame 210 has been completed, the controller may close the vehicle door 120 based on the docking release request (opposite to S430). Here, both portions of the vehicle door 120 may swing around the external end portions thereof which come into contact with the body frame 110 of the vehicle 100 within the sealing unit 230 so that the central portion of the vehicle door 120 may be closed. Thereafter, the controller may reduce the sealing unit 230 toward the building in the closed state of the vehicle door 120 (opposite to S420), and may slide the external door 220 from the external wall of the building to the entrance frame 210 to complete release of docking of the vehicle 100 with the building (opposite to S410).

The above-described docking system and the control method therefor may be implemented in the vehicle 100 including a variable roof module 140.

Figure 5:
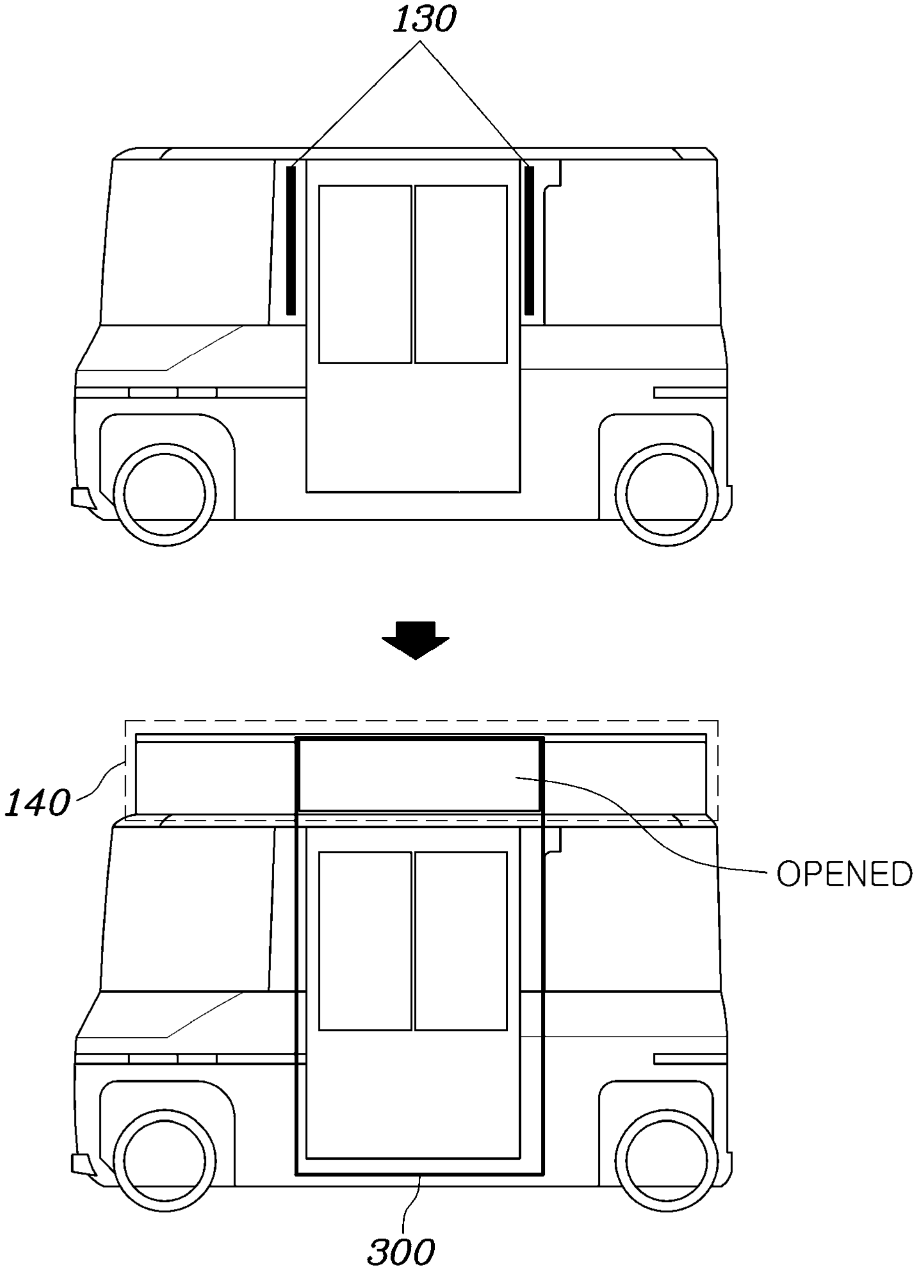
FIG. 5 is a schematic view showing elevation of a variable roof module of the vehicle according to various exemplary embodiments of the present disclosure.

FIG. 5 is a schematic view showing elevation of the variable roof module 140 of the vehicle 100 according to various exemplary embodiments of the present disclosure.

Referring to FIG. 5, the variable roof module 140 may be elevated or lowered through hydraulic cylinders 130 disposed in the direction of gravity. When the variable roof module 140 is elevated to perform docking of the vehicle 100 with the building, a panel configured to support the roof of the vehicle 100 may not be disposed on the upper end portion of the vehicle door 120 to secure a space for passenger's heads when the passengers enter and exit the vehicle 100. Furthermore, the body frame 110 of the vehicle 100, which is coupled to the sealing unit 230, may form a sealing area 300 along the peripheral border of the body frame 110, being configured for preventing inflow of external noise and moisture.

As described above, the docking system and the control method therefor according to the exemplary embodiments of the present disclosure may connect the internal space of the vehicle 100 and the indoor space of the building into one space through the structure including the entrance frame 210, the external door 220, the internal door 240 and the sealing unit 230, being configured for increasing convenience of space utilization.

As is apparent from the above description, a docking system between a vehicle and a building and a control method therefor according to an exemplary embodiment of the present disclosure may connect the internal space of the vehicle and the indoor space of the building into one space through a structure including an entrance frame, an external door, an internal door and a sealing unit, being configured for increasing convenience of space utilization.

Furthermore, the term "unit" or "control unit," as like included in a hybrid control unit, is only a widely used term for a name of a controller configured for controlling a specific function of a vehicle, and does not mean a generic function unit. For example, each unit or control unit may include a communication device configured to communicate with another control device or sensor to control a function assigned thereto, a memory configured to store an operating system or logic command input/output information, and one or more processors configured to perform determination, determination, decision, etc. necessary for controlling the function assigned thereto.

The term "and/or" is used to include any combination of plural subject items. For example, "A and/or B" includes all three cases such as "A", "B", and "A and B".

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various exemplary embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling docking between a vehicle and a building, the method comprising:

receiving, by a controller, a docking request from the vehicle in a state in which parking of the vehicle is completed;

opening, by the controller, an external door, provided at a side of a vehicle door, according to the received docking request;

extending, by the controller, a sealing unit, inserted within an entrance frame provided between the external door and an internal door, and configured to selectively extend in a direction toward the vehicle door in an opened state of the external door to connect and form an internal space of the vehicle and an indoor space of the building into one space; and opening, by the controller, the internal door, spaced from the external door and provided at a side of the building, in an opened state of the vehicle door, wherein the receiving of the docking request from the vehicle, the opening of the external door, the extending of the sealing unit, the opening of the vehicle door, and the opening of the internal door are proceeded in sequence.

2. The method of claim 1, further including opening, by the controller, the vehicle door by rotating the vehicle door within the sealing unit, when the internal space of the vehicle and the indoor space of the building are connected by extending the sealing unit in the direction toward the vehicle door.

3. The method of claim 1, further including:

receiving, by the controller, a docking release request from the vehicle in an opened state of the internal door; and closing, by the controller, the internal door according to the received docking release request.

4. The method of claim 1, further including coupling, by the controller, the sealing unit to a body frame of the vehicle, when the internal space of the vehicle and the indoor space of the building are connected by extending the sealing unit in the direction toward the vehicle door.

* * * * *